(12) United States Patent
Rodrig et al.

(10) Patent No.: US 6,256,314 B1
(45) Date of Patent: Jul. 3, 2001

(54) APPARATUS AND METHODS FOR ROUTERLESS LAYER 3 FORWARDING IN A NETWORK

(75) Inventors: Benny Rodrig, Tel Aviv; Lior Shabtai, Ganei Tikva, both of (IL)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/132,030

(22) Filed: Aug. 11, 1998

(51) Int. Cl.[7] .............................. H04L 12/56; G06F 15/16
(52) U.S. Cl. ........................ 370/401; 370/424; 709/220; 709/238
(58) Field of Search .................................. 370/254, 255, 370/352, 389, 392, 400, 401, 409, 428, 469, 424; 709/220, 230, 238

(56) References Cited

U.S. PATENT DOCUMENTS

| | | | |
|---|---|---|---|
| 5,309,437 | * 5/1994 | Perlman | 370/401 |
| 5,420,862 | * 5/1995 | Perlman | 370/401 |
| 6,003,074 | * 12/1999 | Vasconcellos | 709/220 |

OTHER PUBLICATIONS

Lifton, R., "RND's Ethernet brouter family—an inside look," *Computer Communications, NL, Elsevier Science Publishers BV*, Amsterdam, vol. 12, No. 5, Oct. 1989, pp. 288–294.

Copperwheat, G. et al., "Layer–3 internet switching—the next step for LAN infrastructure", *Data Communications*, Oct. 1998, pp. 17–20.

* cited by examiner

Primary Examiner—Alpus H. Hsu
Assistant Examiner—Afsar M. Qureshi
(74) Attorney, Agent, or Firm—Barry H. Freedman; Thomas J. Bean (57) ABSTRACT

A layer 3 forwarding method for layer 3 forwarding an individual packet from a station I to a station II wherein the packet's layer 2 destination includes a router within the network which is reachable from a network element A via which stations I and II are connected to the network, the router storing ARP information, the method including providing network element A with a capability to perform layer 3 forwarding of a packet from station I to station II, wherein the providing step includes learning, on the part of network element A, of forwarding information used by the router to forward packets from station I to station II, by reading the ARP information of the router and performing layer 3 forwarding on the individual packet, at network element A.

29 Claims, 9 Drawing Sheets

Figure 1:

10 — provide network including station I, connected via network element A capable of performing the routing function for at least some packets, station II, connected via network element B and belonging to different subnet than station I, and router reachable from network elements A and B via a common ancestor element C.

20 — ancestor element C analyzes packets passing through it and/or analyzes ARP- or IP-packets originating at station II and received at element C, thereby to learn forwarding information useful for forwarding packets from station I to station II (e.g. layer 2 address of station II) till element C is capable of routing packets from station I to station II.

25 — element A recognizes that station II and the router are reachable through the same port, thereby to refrain from learning forwarding information useful for forwarding packets to station II even if such information could be learned by element A by analyzing packets, such that element A is not capable of routing packets to station II.

30 — ancestor element C performs routing function on packet whose layer 2 destination comprises router, without any routing function on packet being performed by element A.

IP-table:

| IP address | MAC address |
|---|---|
| 193.1.2.3 | 00805AC469B0 |
| 156.33.1.1 | 006A3407F62E |

MAC-table:

| MAC address | Port |
|---|---|
| 00805AC469B0 | 1 |
| 006A3407F62E | 2 |
| 0080D156C873 | 3 |
| 0032EC4527A7 | 1 |
| 00284F5D8C24 | 2 |

IP-table:

| IP address | MAC address | VLAN ID | learned flag |
|---|---|---|---|
| 193.1.2.3 | 00805AC469B0 | 8 | Clear |
| 156.33.1.1 | 006A3407F62E | 5 | Set |

Figure 7B:

MAC-table :

| MAC address | Port |
|---|---|
| 00805AC469B0 | 1 |
| 006A3407F62E | 2 |
| 0080D156C873 | 3 |
| 008B890ED326 | 4 |

Figure 7C:

Learning Control table:

| IP address | Mask |
|---|---|
| 193.1.2.0 | 255.255.255.0 |
| 156.33.0.0 | 255.255.0.0 |

APPARATUS AND METHODS FOR ROUTERLESS LAYER 3 FORWARDING IN A NETWORK

FIELD OF THE INVENTION

The present invention relates to networks and apparatus and methods for switching in networks.

BACKGROUND OF THE INVENTION

Local area networks (LANs) and IP networking are well known in the art. LANs and IP networking in general and in particular relevant aspects of IP routing and ARP are described in the following publications:

International Standard for MAC Bridging: Std 802.1D, IEEE, 1993,

Virtual LANs (VLANs) standard: 802.1Q, IEEE, 1998,

LANE Standard: LAN Emulation Over ATM Version 2—LUNI Specification, af-lane-0084.00, ATM Forum, July 1997, available over the Internet at www.atmforum.com, MPOA standard: Multi-Protocol Over ATM Specification v1.0, af-mpoa-0087.000, ATM Forum, July 1997, available over the Internet at www.atmforum.com, "Layer 3 switches", InfoWorld magazine, Jun. 1, 1998 (Vol. 20, Issue 22), available over the Internet from www.infoworld.com, the following Internet RFC documents, which are available over the Internet from, for example, the IETF home page at www.ietf.org: IP—RFC 791 ("Internet Protocol"), ARP—RFC 826 ("Address Resolution Protocol"), RFC 1812 ("Requirements for IP version 4 Routers"), RFC 1700 ("ASSIGNED NUMBERS"), RFC 1256 ("ICMP Router Discovery Messages"), SNMP—RFC 1157 ("Simple Network Management Protocol"), RFC 1213 ("Management Information Base for Network Management of TCP/IP-based internets: MIB-II"), VRRP—RFC 2338 ("Virtual Router Redundancy Protocol") and HSRP RFC 2281 ("Cisco Hot Standby Router Protocol").

Most routing-switches/switch-routers/layer-3-switches known today follow the same network architecture principles as traditional routers, in the sense that each switch is a routing entity, running routing protocols and requiring the configuration and maintenance of a router. If such layer 3 switches are installed centrally only in some locations in the network, while the rest of the network switches are layer 2 only, then the performance of layer 3 forwarding is limited. In order to achieve a distributed layer 3 switching system, such that the function of layer 3 forwarding is done in the most appropriate point in the network, this design calls for many or all of the network switches to be layer 3 switches. This requires the configuration and maintenance of multiple routing entities in the local area network, which is a significant configuration burden.

Some switching systems are designed around the concept of a central routing server with distributed layer-3 forwarding engines. These systems require a special protocol to communicate forwarding information between the routing server and the layer 3 forwarding engines. Some of these systems implement the MPOA standard for ATM networks. In Ethernet networks these protocols are proprietary requiring that the routing server and all layer 3 forwarding devices be from a single vendor, limiting the user's choice. Also, the introduction of such systems into an existing network requires a major change to the network.

Some ideas for layer 3 switching based on automatic learning of IP stations have been published. These are used by switches that front end a router to enhance its forwarding performance, and are not described as extended to network-wide distributed layer 3 switching systems. Such switches can perform layer 3 (IP) switching without being a router, i.e. without being known to stations as routers and without requiring the configuration that routers do. They assume the existence of a router in the network, use it as default forwarder and automatically learn information about IP stations.

The disclosures of all publications mentioned in the specification and of the publications cited therein are hereby incorporated by reference.

SUMMARY OF THE INVENTION

A preferred embodiment of the present invention seeks to provide a network in which the function of layer 3 forwarding is distributed among multiple switches in the network without any of the multiple switches necessarily being a router. The system shown and described herein does not necessarily follow the 'routing per port' approach common with modern layer 3 switches. The layer 3 forwarding is not always performed by the switch that: is closest to the source, rather it may be performed by a switch that is on the path from the router to the destination, in addition to being on the path from the source to the router.

Another preferred embodiment of the present invention seeks to allow a switch (or switches) to boost an entire network, rather than boosting a specific router. This embodiment is useful, for example, in providing distributed layer 3 forwarding in switched Ethernet networks. Another application is in networks including Ethernet and ATM-LANE wherein the present invention is useful in providing high performance layer 3 switching, instead of or in addition to MPOA (multi-protocol over ATM).

In the network-boosting embodiment, the switch does not necessarily know the MAC addresses) of the router(s). Rather, the switch preferably performs the layer 3 forwarding function by itself to packets that require layer 3 forwarding, whether these packets are addressed at the MAC layer to a single router or to different routers. The switch preferably identifies the packets as requiring layer 3 forwarding by means other than recognition of the packet's destination MAC address as being that of the router. Typically, the switch may identify packets requiring layer 3 forwarding by discerning that the destination MAC address of the received packet is different than the MAC address known to the switch as corresponding to the destination IP address of the packet.

There is thus provided, in accordance with a preferred embodiment of the present invention, a method by which a network element, having a plurality of ports, performs layer 3 forwarding within a network including at least one router, the method including identifying, for each router in the network, at least one of the plurality of ports, via which the router is reachable, as an upstream port with respect to the router, and identifying at least one other ports as downstream ports with respect to the router, and, upon receiving a packet whose layer 2 destination is the router, performing layer 3 forwarding if the network element is in possession of forwarding information indicating that the packet's layer 3 destination is reachable via any of the downstream ports with regard to the router.

Further in accordance with a preferred embodiment of the present invention, a packet on which layer 3 forwarding is not performed by the network element is forwarded by the network element at layer 2.

Further in accordance with a preferred embodiment of the present invention, the packet has a layer 3 source and a layer 3 destination which are in different subnets.

Still further in accordance with a preferred embodiment of the present invention, the method also includes learning the forwarding information.

Additionally in accordance with a preferred embodiment of the present invention, the forwarding information includes the VLAN ID corresponding to the layer 3 destination of the packet.

Still further in accordance with a preferred embodiment of the present invention, the forwarding information includes the layer 2 address corresponding to the layer 3 destination of the packet.

Additionally in accordance with a preferred embodiment of the present invention, the forwarding information is learned at least partly by analyzing packets passing though the network element.

Further in accordance with a preferred embodiment of the present invention, the forwarding information is learned entirely by analyzing packets passing though the network element.

Still further in accordance with a preferred embodiment of the present invention, the forwarding information is learned at least partly by analyzing ARP-packets passing through the network element.

Further in accordance with a preferred embodiment of the present invention, the forwarding information is learned at least partly by analyzing IP-packets passing through the network element.

Still further in accordance with a preferred embodiment of the present invention, the forwarding information is learned at least partly by analyzing layer 3 packets passing through the network element whose source layer 2 address is an address of a router.

Also provided, in accordance with another preferred embodiment of the present invention, is a layer 3 forwarding method for layer 3 forwarding an individual packet from a station I to a station II wherein the packet's layer 2 destination includes a router within the network which is reachable from a network element A via which stations I and II are connected to the network, the router storing ARP information, the method including providing network element A with a capability to perform layer 3 forwarding of a packet from station I to station II, wherein the providing step includes learning, on the part of network element A, of forwarding information used by the router to forward packets from station I to station II, by reading the ARP information of the router, and performing layer 3 forwarding on the individual packet, at network element A.

Further in accordance with a preferred embodiment of the present invention, the step of reading the ARP information includes using an SNMP mechanism to read the ARP information.

Also provided, in accordance with another preferred embodiment of the present invention, is a method by which a network element, having a plurality of ports, performs layer 3 forwarding, using forwarding information, within a network including at least one router, the method including determining, upon receiving a packet, whether or not the packet requires layer 3 forwarding, without using any information regarding the identity of the router, and performing layer 3 forwarding if the packet requires layer 3 forwarding and if all necessary forwarding information is available, and performing layer forwarding otherwise.

Further in accordance with a preferred embodiment of the present invention, the layer 3 source of the packet and the layer 3 destination of the packet are in different subnets.

Further in accordance with a preferred embodiment of the present invention, the method also includes learning forwarding information useful for performing the layer 3 forwarding step.

Still further in accordance with a preferred embodiment of the present invention, the forwarding information includes the VLAN ID corresponding to the layer 3 destination of the packet.

Further in accordance with a preferred embodiment of the present invention, the forwarding information includes the layer 2 address corresponding to the layer 3 destination of the packet.

Still further in accordance with a preferred embodiment of the present invention, the forwarding information includes information pertaining only to stations whose IP addresses have been designated by the user as being eligible to be learned.

Still further in accordance with a preferred embodiment of the present invention, the forwarding information is learned at least partly by analyzing packets passing though the network element.

Additionally in accordance with a preferred embodiment of the present invention, the forwarding information is learned entirely by analyzing packets passing though the network element.

Still further in accordance with a preferred embodiment of the present invention, the forwarding information is learned at least partly by analyzing ARP-packets passing through the network element.

Further in accordance with a preferred embodiment of the present invention, the forwarding information is learned at: least partly by analyzing IP-packets passing through the network element.

Still further in accordance with a preferred embodiment of the present invention, the forwarding information is learned at least partly by analyzing layer 3 packets passing through the network element whose source layer 2 address is an address of a router.

Further in accordance with a preferred embodiment of the present invention, layer 3 forwarding is performed on the packet by the network element only if the layer 2 address corresponding to the packet's layer 3 destination, as known to the network element, is different than the destination layer 2 address of the packet.

Still further in accordance with a preferred embodiment of the present invention, a packet on which layer 3 forwarding is not performed by the network element is forwarded by the network element at layer 2.

Further in accordance with a preferred embodiment of the present invention, layer 3 forwarding of the packet is performed by the network element only if the destination layer 2 address of the packet is known to the network element to be reachable via a port that is different than the port from which the packet was received at the network element.

Still further in accordance with a preferred embodiment of the present invention, the packet is discarded if the destination layer 2 address of the packet is known to the network element to be reachable via the port from which the packet was received at the network element.

Further in accordance with a preferred embodiment of the present invention, the performing step includes changing the source layer 2 address of the packet to a layer 2 address of network element A.

Also provided, in accordance with another preferred embodiment of the present invention, is a system by which a network element, having a plurality of ports, performs layer 3 forwarding within a network including at least one router, the system including a port identifier operative, for each router in the network, to identify at least one of the plurality of ports, via which the router is reachable, as an upstream port with respect to the router, and to identify at least one other ports as downstream ports with respect to the router, and a layer 3 forwarding unit operative, upon receiving a packet whose layer 2 destination is the router, to perform layer 3 forwarding if the network element is in possession of forwarding information indicating that the packet's layer 3 destination is reachable via any of the downstream ports with regard to the router.

Also provided, in accordance with another preferred embodiment of the present invention, is a layer 3 forwarding system for layer 3 forwarding an individual packet from a station I to a station II wherein the packet's layer 2 destination includes a router within the network which is reachable from a network element A via which stations I and II are connected to the network, the router storing ARP information, the system including a learning unit operative to provide network element A with a capability to perform layer 3 forwarding of a packet from station I to station II, wherein the providing step includes learning, on the part of network element A, of forwarding information used by the router to forward packets from station I to station II, by reading the ARP information of the router, and at network element A, a layer 3 forwarding unit for layer 3 forwarding of the individual packet.

A system by which a network element, having a plurality of ports, performs layer 3 forwarding, using forwarding information, within a network comprising at least one router, the system including apparatus for determining, upon receiving a packet, whether or not the packet requires layer 3 forwarding, without using any information regarding the identity of the router and apparatus for performing layer 3 forwarding if the packet requires layer 3 forwarding and if all necessary forwarding information is available, and for performing layer 2 forwarding otherwise.

It is appreciated that when an element I is said to be connected to a network "via an element II", element I need not necessarily be directly connected to element II. In other words element I is a descendant of, but not necessarily a son of, element II.

The term "network element" includes any device through which packets pass while traversing the network including any type of switches, including but not limited to LAN switches; MAC switches; Ethernet switches; Ethernet edge devices; switches with Ethernet ports and at least one ATM ports, operating LANE and optionally also MPOA; MAC bridges; layer 3 switches; multi-layer switches and routing switches.

The term "station" includes any device originating or receiving packets including but not limited to workstations, computers, printers, servers and routers.

The term "router" includes any device that is known to a station as a router or gateway via which off-subnet destinations can be reached, including but not limited to routers, layer 3 switches, multi-layer switches and routing switches.

The phrases "routing a packet", "performing a routing function on a packet", "layer 3 forwarding of a packet" and the like, are substantially equivalent. For example, these phrases may refer to IP forwarding as defined in RFC 1812.

The term "subnet" is intended to be a general term referring to a set of stations having common characteristics, such as an IP subnet, an IP net, etc.

It is appreciated that the present invention is applicable to networks having only one router but also to networks having many routers.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Reference is now made to FIGS. 1–5 which illustrate a switching method constructed and operative in accordance with a first embodiment of the present invention.

Figure 1:
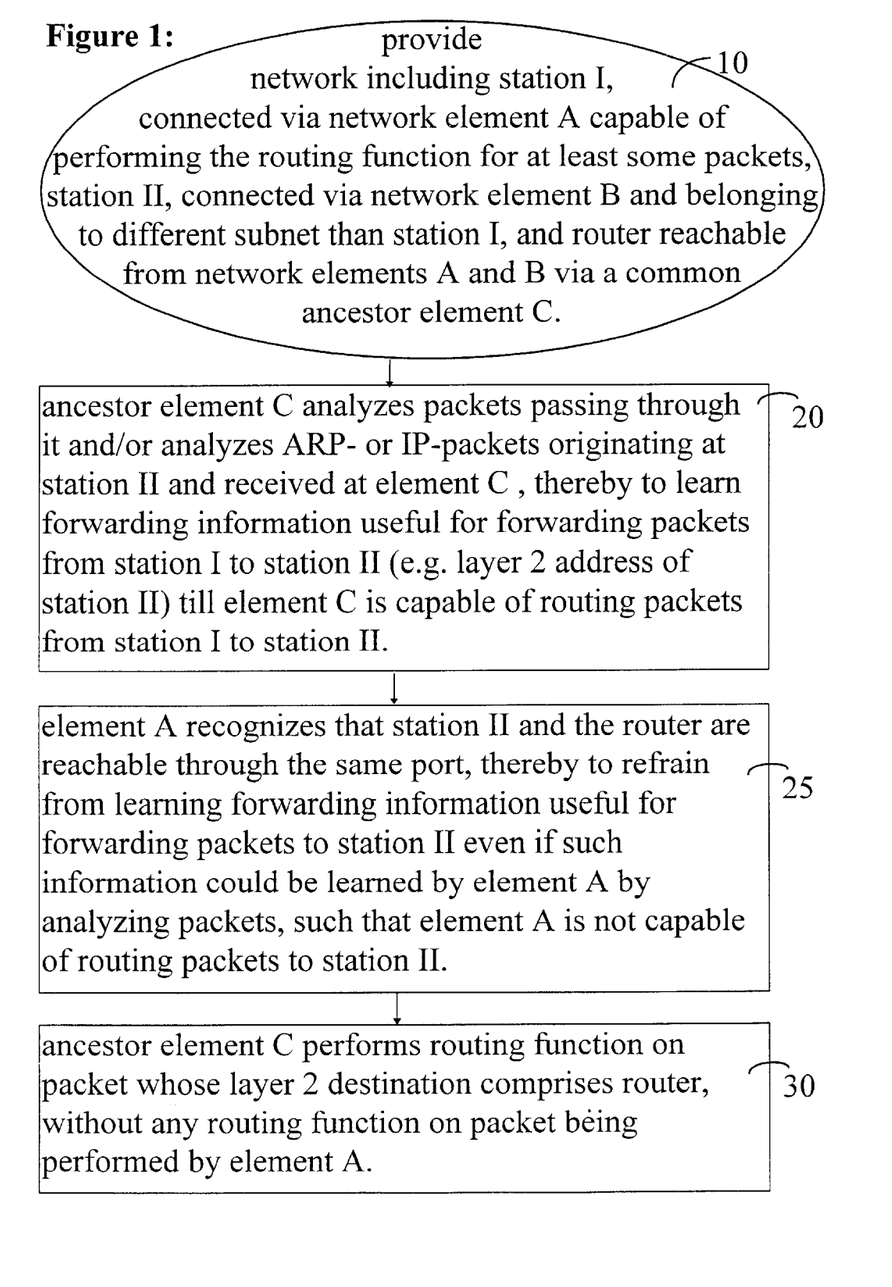
FIG. 1 is a simplified flowchart illustration of a switching method constructed and operative in accordance with a preferred embodiment of the present invention.

FIG. 1 is a simplified self-explanatory flowchart illustration of a switching method constructed and operative in accordance with a first embodiment of the present invention.

Figure 2A:
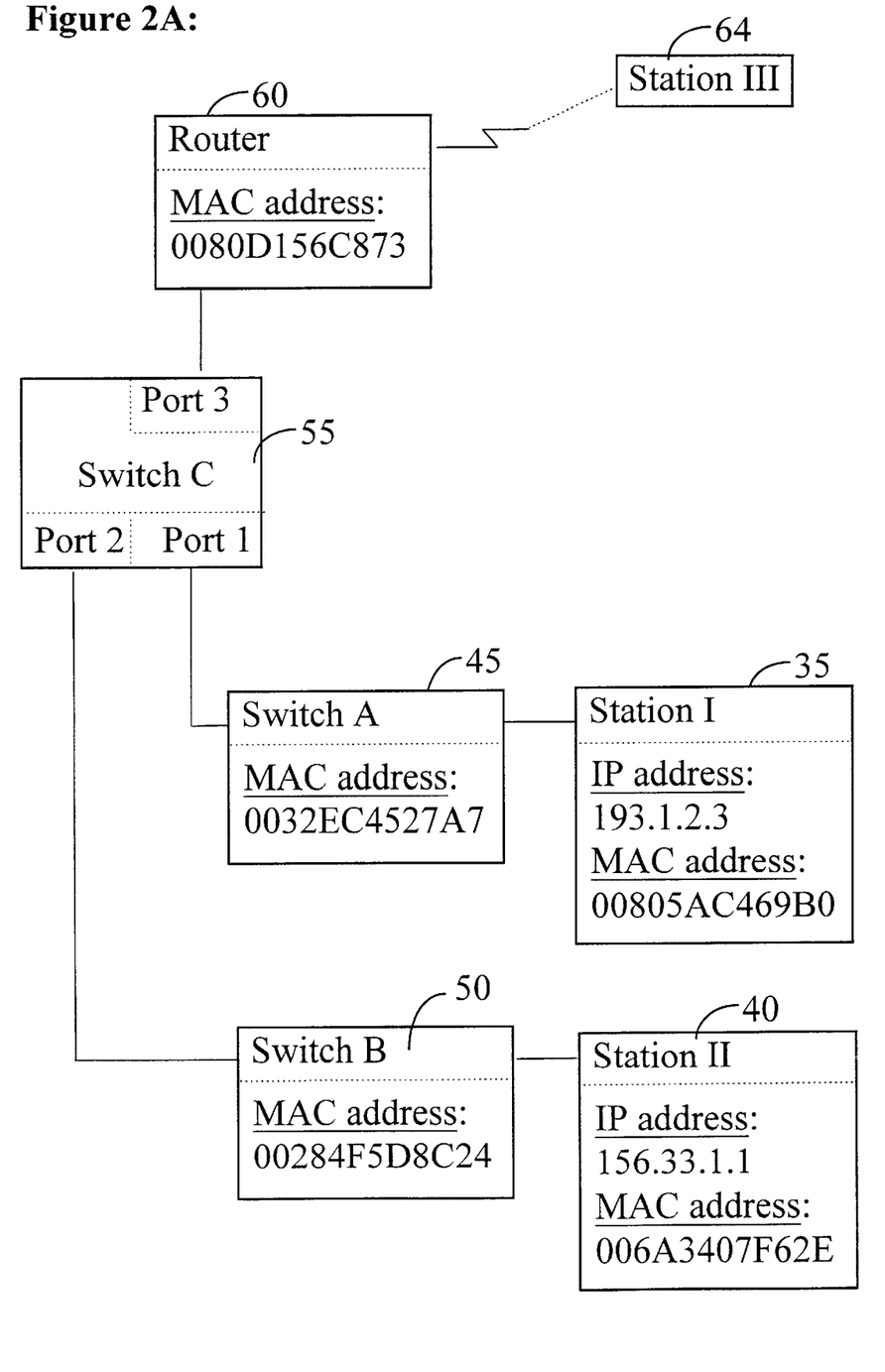
FIG. 2A is an example of a network provided in accordance with the method of FIG. 1.

FIG. 2A is a simplified block diagram of a resulting network constructed and operative in accordance with a first embodiment of the present invention. The layer 3 forwarding function for IP packets from station I to station II is performed by switch C and not by switch A. The "switches" of FIG. 2A may each in fact comprise any suitable network element and need not necessarily be switches.

The lack of requirement to perform the layer 3 function in the switch closest to the source eliminates the main problem that alternative designs deal with, which is how that switch acquires the necessary layer 3 forwarding information. The common approach requires that switch to be a full router, thereby to obtain all information. The routing server approach calls for special protocols by which the routing server conveys the necessary layer 3 forwarding information to that switch. None of these is necessary if routing is not required to be performed at the switch closest to the source, since that switch does not need any information other than information it can easily learn by itself. If the switch that performs the layer 3 switching function is on the path from the router to the destination it can easily learn all the information needed from packets passing through it.

In addition, in the embodiment of FIGS. 1–5, a switch, when performing the standard layer 3 forwarding function for an IP packet, typically writes the router's MAC address in the source MAC address field of the forwarded packet. If this function is performed by switch A for a packet from station I to station II then this results in a packet, having the router's MAC address as source, being transmitted from switch A into the switching system in the direction of the router. If the switching system includes simple standard switching devices, the MAC learning mechanism is confused by seeing the same MAC address coming in from two different directions, from the router and from switch A, resulting in network connectivity problems.

This difficulty is preferably substantially eliminated in the embodiment of FIGS. 1–5. Each switch performs layer 3 forwarding only for traffic going in a direction other than toward the router. The switch port via which the router is reachable is referred to as the upstream port, and the switch only performs layer 3 forwarding between downstream ports. To all stations and devices downstream of the switch (i.e. reachable via a downstream port of the switch), the packets routed (forwarded at layer 3) by the switch appear just as if they were routed by the router.

Distributing the layer 3 forwarding function in the network in such a way that each switch only performs layer 3 forwarding between downstream ports has additional advantages such as for security. For example, a network may be installed in a building in which network traffic between floors is subject to access restriction but the traffic is not subject to any restrictions between stations on the same floor. Access control packet filtering in this case can be configured to the backbone switch only (e.g. switch C of FIG. 2A) with no access control configuration at all at the floor switches (e.g. switches A and B of FIG. 2A), since these never try to route packets to other floors.

This implies that the floor switches can be simpler and less expensive than the backbone switch and can have different filtering capabilities and even not support packet filtering at all. User ability to comprehend and predict which switch performs the layer 3 switching function for which sort of packets can also imply simpler configuration of the access control packet filtering rules.

This distribution of the layer 3 forwarding function yields no problem with scaling performance, due to the assumption that all the switches can forward traffic at wire speed both at layer 2 and at layer 3. The packets typically follow a certain path from source to destination. Therefore, the exact location in that path in which the layer 3 function is performed does not affect the overall performance of the switching function.

According to the first embodiment of the present invention described in FIGS. 1–5, the switch acquires knowledge regarding the router's MAC address and the identity of the switch port through which the router is reachable. One way for the switch to acquire this knowledge is to require that the IP address of the router be provided to the switch via manual configuration. The switch may then learn the rest by sending ARP requests to the router and learning from the ARP replies. Another way for the switch to acquire this knowledge is for the switch to learn about the router automatically by identifying routing protocol messages (e.g RIP, OSPF, IGRP, EIGRP) and/or ICMP router discovery protocol messages, and learning the source address of these messages.

There may be more than a single router known to the switches. If so, then all switch activities described in this invention relating to 'the router' are typically performed for each of the routers. Specifically, packets are learned if sent by any one of the routers, packets are forwarded at layer 3 by the switch if their destination MAC address is that of any of the routers, etc. When the methods of the present invention are used in a network containing multiple routers, the method typically takes into account occurrences in which the multiple routers back each other up, using router redundancy mechanisms. These mechanisms include (but are not limited to) HSRP and VRRP, and may involve having to know an additional MAC address representing a 'virtual router'. This MAC address is acquired by the switch using the same methods described above, or via manual configuration.

The apparatus and methods of the present invention may be used in networks in which Virtual LANs (VLANs) are deployed. In such a network the router and the switch may be able to communicate VLAN information. Alternatively, the router may be unaware of VLANs and connected to the switch via some sort of a 'global' port that forwards packets of all VLANs. Alternatively, the router may be connected to the switching system via multiple interfaces, one per VLAN. In such cases the switch may need to be aware of multiple MAC addresses of the router and how they correspond to the different VLANs.

If there are multiple routers in a network which includes Virtual LANs, the switch may need to know which MAC addresses correspond to the same router, in order for the switch to use the appropriate source MAC address when forwarding packet at layer 3. The switch can acquire this knowledge from manual configuration or by automatic means such as by monitoring, via SNMP, some of the router databases, such as the IP address table and Interface table from the standard MIB-II.

The switch automatically learns about IP stations, and the forwarding information necessary to perform layer 3 forwarding of packets destined at those stations. This information includes the destination MAC address to be used when forwarding a packet to that IP station at layer 3. Additional information may be learned too, such as the VLAN ID. The information may be learned by any suitable method such as but not limited to any one of or any combination of the methods described below.

In the embodiment of FIGS. 1–5, the switch is aware of the upstream port, the port through which the router is reachable, and typically avoids learning any station reachable through that port. The learning mechanism of FIGS. 1–5 is preferably dynamic and includes being updated about stations moves and changes. If an IP station known to the switch is moved such that it is now reachable through the upstream port, then the switch removes that station from its database of IP stations. The IP learning process may receive indications about station moves and changes from the MAC learning process of the switch. There may be an aging process on the learned information, and user configuration may control the characteristics of the aging mechanism as well as controlling the types of stations to which it is applied (e.g. faster aging for remote IP stations that are reachable via another router).

Preferred learning methods include:

a. learning the destination of IP packets sent from the router, i.e. learning from packets whose source MAC address is the MAC address of the router and whose destination IP address is the IP address of the learned station b. Learning the source of ARP packets, either ARP requests or ARP replies, or both c. Learning the destination of ARP replies d. Learning the source of IP packets, either all or only those from local subnets or those that belong or that do not belong to pre-configured IP address ranges e. Learning the source of IP packets sent to or from certain MAC addresses or those that are explicitly not sent to or from certain MAC addresses (e.g. IP packets sent to the MAC address of the router but do not have the MAC address of another router as their source MAC address).

f. Learning from the router's ARP tables or other databases that can be read from the router using SNMP or other mechanism.

g. Learning from user configuration.

In the embodiment of FIGS. 1–5, the switch imitates the router and handles packets in the same way that the router would handle the same packets. This way, the first of a stream of packets to a certain station may be unknown to the switches and routed by the router, but subsequent packets are routed by the switch, having learned all the necessary information from the first packet.

According to the embodiment of FIGS. 1–5, each packet whose destination MAC address is the router's MAC address, and whose destination IP address is known to the switch, is forwarded at layer 3 (i.e. routed) by the switch. Exception packets, like those having IP options or TTL that equals zero, may not be routed by the switch and instead may be forwarded at layer 2. The switch preferably forwards at layer 3 according to the standard routing function, including checking packet validity, replacing the MAC header, decrementing TTL and updating the checksum. The switch writes the router's MAC address or another MAC address in the source MAC address field of the packet. Alternative designs can use the same learning methods and avoid some parts of the standard routing function, like forwarding the packet without changing its source MAC address, or forwarding the packet without changing anything other than the destination MAC address, or even forwarding the packet without checking that the packet destination MAC address is that of the router.

The layer 3 forwarding process in the switch may be combined with access control packet filtering mechanisms, that may result in blocking packets and/or in forwarding them at layer 2.

According to the embodiment of FIGS. 1–5, each packet whose destination MAC address is the router's MAC address, and whose IP destination is unknown to the switch, is typically switched at layer 2 and is hence forwarded toward the router. It is then either forwarded at layer 3 by another switch on the path to the router, or reaches the router and is routed by it.

There are different cases where the packet reaches the router, such as the following cases:

a. Special types of packets that are not handled by the switch and are always forwarded at layer 2, such as packets with IP options.

b. Packets that go beyond the router, like packets sent from A to D in the network of FIG. 2A. The destination D may never be learned by the switches, such that D is always unknown to the switches A and C and all packets to D are switched by switches A and C at layer 2.

c. Local packets that go back to stations in the switched network that are yet unlearned by the switches. The amount of local traffic going through the router is small, since the appropriate switches soon learn the new station from analyzed packets and start handling such traffic themselves.

Figure 2B:
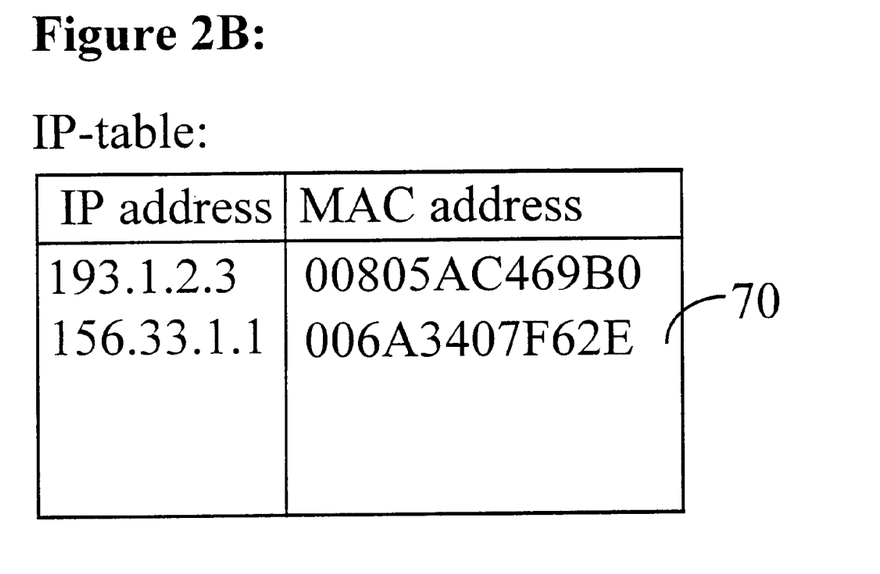
FIG. 2B is an example of an IP table of network element C of FIG. 2A.

FIG. 2B is an example of an IP table 70 of network element C of FIG. 2A. As shown, the IP table of network element C typically stores the IP and MAC addresses of each station downstream of network element C.

Figure 2C:
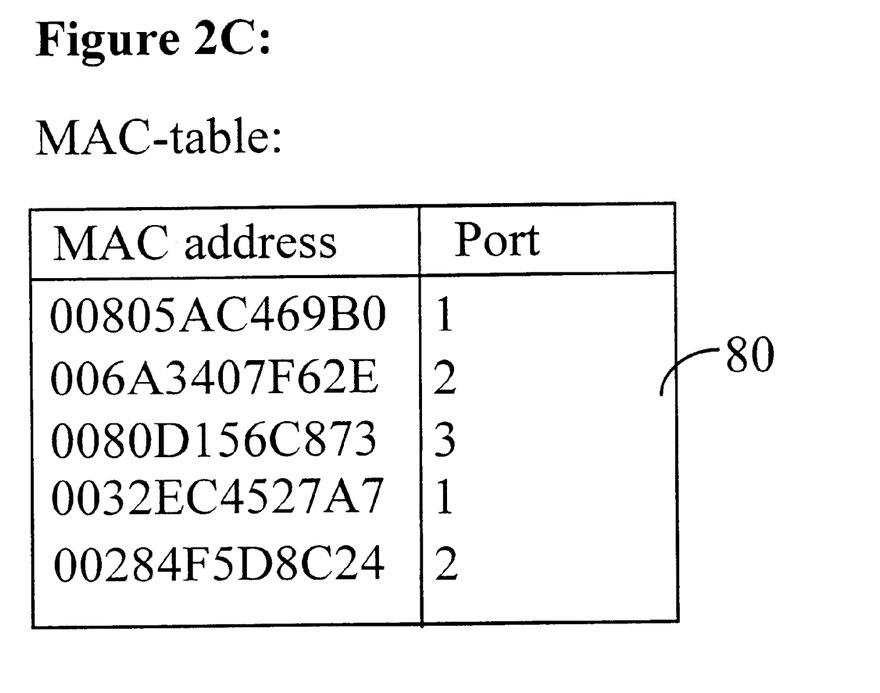
FIG. 2C is an example of a MAC table of network element C of FIG. 2A.

FIG. 2C is an example of a MAC table of network element C of FIG. 2A. As shown, the MAC table of network element C typically stores, for each MAC entity within a MAC network of network element C, the MAC entity's MAC address and the port of network element C via which the network element C forwards packets to that MAC entity. The MAC network of a network element typically includes all MAC entities (network elements, routers or stations), which are connected to that network element either directly or via a switch or bridge but not via a router.

Figure 3:
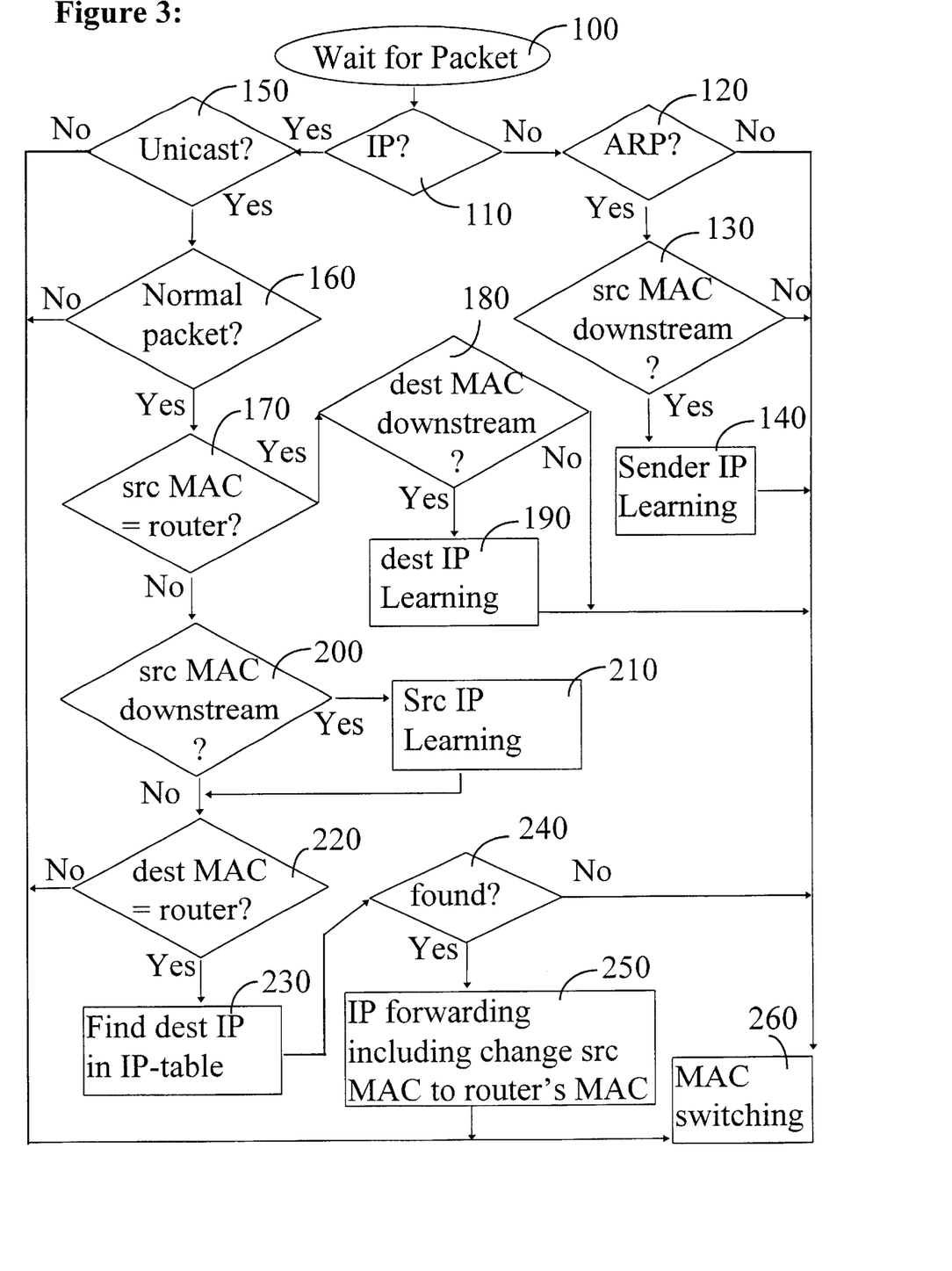
FIG. 3 is a simplified flowchart illustration of a preferred packet flow sequence in a switch or other network element such as network elements A and C in FIG. 2A.

Reference is now made to FIG. 3 which is a simplified generally self-explanatory flowchart illustration of preferred packet flow in a switch, such as packet flow in network element A and in network element C, in FIG. 2A. Explanations regarding certain of the steps now follow:

WAIT FOR PACKET (step 100)—The system waits for a packet to arrive and upon its arrival, activates step 110.

IP? (step 110)—The frame is identified as being of type IP. For example, on Ethernet networks, a frame with Ethertype 0×800 carries an IP packet.

ARP? (step 120)—The frame is identified as being of type ARP. For example, on Ethernet networks, a frame with Ethertype 0×860 carries an ARP packet.

SRC MAC DOWNSTREAM (step 130)—the source MAC address of the packet is not unknown, i.e. is found in the MAC-table 80 of FIG. 2C and the port corresponding to it in the MAC-table 80 of FIG. 2C is not the port through which the router is reachable.

SENDER IP LEARNING (optional step 140)—read the sender IP address from the ARP message in the packet. Find in the IP-table 70 of FIG. 2B the record corresponding to this IP address. If there is no such record in the table 70 of FIG. 2B then create one. Read the source MAC address from the sender hardware address field of the ARP message in the packet. Write this MAC address into the MAC address field of that record in IP-table 70 of FIG. 2B.

UNICAST? (step 150)—The packet is a unicast packet if its destination MAC-address is a unicast MAC address.

NORMAL IP PACKET (step 160)—The IP packet is valid according to the definition in RFC 1812. In addition, the IP packet is of version 4, does not contain any IP options and TTL is greater than 1.

SRC MAC=ROUTER? (step 170)—In this step, the source MAC address of the packet is checked. If it is equal to the MAC address of a router, then the packet is known to have been originated or forwarded by the router.

DEST MAC DOWNSTREAM (step 180)—the destination MAC address of the packet is not unknown, i.e. is found in the MAC-table 80 of FIG. 2C and the port corresponding to it in the MAC-table 80 of FIG. 2C is not the port through which the router is reachable.

DEST IP LEARNING (step 190)—read the destination IP address from the IP header of the packet. Find in IP-table 70 of FIG. 2B the record corresponding to this IP address. If there is no such record in the table 70 of FIG. 2B then create one. Read the destination MAC address from the MAC header of the packet. Write this MAC address into the MAC address field of that record in IP-table 70 of FIG. 2B. Read the source MAC address from the MAC header of the packet. Write this MAC address into the router's MAC field of that record in the IP table 70 of FIG. 2B.

SRC MAC DOWNSTREAM? (step 200)—The source MAC address field of the packet is checked against the MAC table 80 of FIG. 2C, to determine whether or not the port the MAC address is mapped to is a downstream port. In FIG. 2A, switch C has two downstream ports (ports 1 and 2) and one upstream port (port 3).

SRC IP LEARNING—(optional step 210)—read the source IP address from the IP header of the packet. Find in IP-table 70 of FIG. 2B the record corresponding to this IP address. If there is no such record in the table 70 of FIG. 2B then create one. Read the source MAC address from the MAC header of the packet. Write this MAC address into the MAC address field of that record in IP-table 70 of FIG. 2B.

DEST MAC=ROUTER? (step 220)—the destination MAC address of the packet is one of the MAC addresses of the router. This identifies the packet as one that may have to go through a routing (layer 3 forwarding) function. The source and destination IP addresses of the packet, i.e. the originating station and the receiving station, are likely to be in different IP nets or subnets.

FIND DEST IP IN IP-TABLE (step 230)—The IP-table 70 of FIG. 2B is searched in order to find a record that matches the destination IP address of the packet.

FOUND? (step 240)—If a record matching the destination IP address of the packet was found in IP-table 70 by step 230 then do step 250. Otherwise, do step 260.

IP FORWARDING (step 250)—typically, the standard IP forwarding function as defined in RFC 1812, including decrementing TTL by one and updating the IP checksum accordingly. In addition—replacing the source MAC address with the router's MAC address and replacing the destination MAC address with the MAC address found in the record in IP-table 70 of FIG. 2B corresponding to dest-IP.

MAC SWITCHING (step 260)—the standard MAC switching function as defined in IEEE standard 802.1D, including learning and updating the MAC-table 80 of FIG. 2C.

Figure 4:
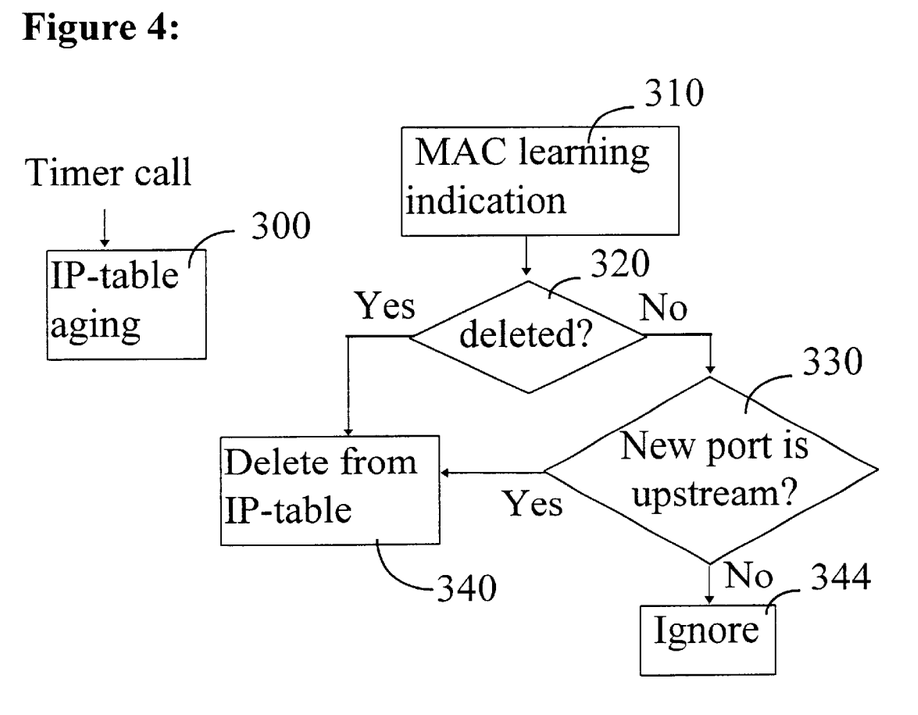
FIG. 4 is a simplified flowchart illustration of a preferred flow control sequence occurring in a switch or other network element such as network elements A and C in FIG. 2A.

FIG. 4 is a simplified flowchart illustration of flow control in a switch, in accordance with a first embodiment of the present invention.

IP-TABLE AGING (step 300)—every 30 seconds delete all records from the IP-table 70 of FIG. 2B.

MAC LEARNING INDICATION (step 310)—indication is received from the MAC learning process in the switch that a certain MAC address was either removed from the MAC-table 80 of FIG. 2C or has changed port. This may be the result of the MAC learning process learning the new information from a received packet or operating an aging function on the MAC-table 80 of FIG. 2C.

DELETED? (step 320)—If the indication received in step 310 indicates removal of a MAC address from MAC-table 80, then perform step 340. Otherwise, i.e. if the indication received in step 310 indicates that a MAC address has changed port, then perform step 330.

NEW PORT IS UPSTREAM? (step 330)—the port associated with this MAC address in the MAC-table 80 of FIG. 2C has changed, and the new port is the port through which the router is reachable.

DELETE FROM IP-TABLE (step 340)—remove from the IP-table 70 of FIG. 2B all the records that specify the said MAC address in their MAC address field.

IGNORE (step 344)—do nothing.

Also provided, in accordance with another preferred embodiment of the present invention, is a layer 3 switching method for layer 3 forwarding an individual packet from a station I to a station II wherein the packet's layer 2 destination comprises a router within the network which is reachable from a network element A via which stations I and II are connected to the network, the router typically storing forwarding information such as ARP information. The method includes providing network element A with a capability to perform a routing function on a packet, routing the packet from station I to station II, wherein the providing step comprises learning, on the part of network element A, of forwarding information used by the router to perform layer 3 forwarding of packets from station I to station II, by reading forwarding (e.g. ARP) information from the router and performing a routing function on said individual packet, at network element A. The router's forwarding (e.g. ARP) information may be read using an SNMP mechanism.

Figure 5:
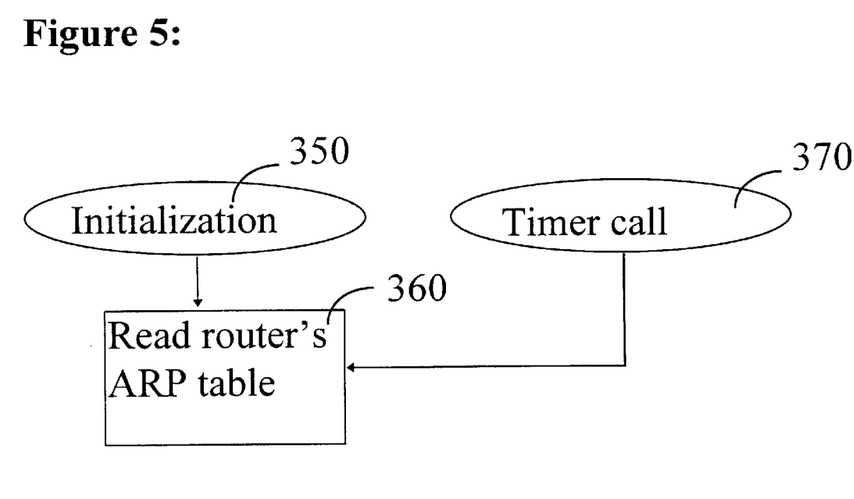
FIG. 5 is a simplified diagram of flow control in a switch or other network element such as network element A in FIG. 2A.

FIG. 5 is a simplified flowchart illustration of preferred flow control in a switch, in accordance with the above-described embodiment of the present invention. At initialization time (step 350), and every e.g. 30 minutes (step 370), the router's ARP table is read (step 360) into the IP table 70 of FIG. 2B. For example, this process may be carried out as follows: SNMP get-next requests are sent to the IP address of the router, where the request's object identifier specifies the net-to-media table defined in MIB-II (RFC 1213). All information in the IP-table 70 of FIG. 2B is replaced with the information received from the router's SNMP replies.

Another preferred embodiment of the present invention is now described with reference to FIGS. 6–9. The embodiment of FIGS. 6–9, like the embodiment of FIGS. 1–5, enables layer 3 switching to take place network wide i.e. at the network's switches without any of the network's switches necessarily being a router.

The embodiment of FIGS. 6–9 allows the switch (or switches) to boost the entire network, rather than a specific router. The switch is not necessarily aware that the router's MAC address(es) are, in fact, MAC addresses of a router. Rather, the switch performs the layer 3 forwarding function by itself to packets that require layer 3 forwarding, whether these packets are addressed at the MAC layer to a single router or to different routers. The switch does not necessarily identify the packets as requiring layer 3 forwarding by recognizing the packet's destination MAC address as the address of the router. The switch may perform this identification by other means as described below.

The switch automatically learns about IP stations, and the forwarding information necessary to perform layer 3 forwarding of packets destined at those stations. This information includes the destination MAC address to be used when layer 3 forwarding a packet to that IP station. Additional information may be learned too, such as the Virtual LAN (VLAN) ID. The information may be learned by any suitable method such as but not limited to any one of or any combination of the methods described below.

The learning mechanism is preferably dynamic and includes being updated about station changes. There may be an aging process on the learned information, and user configuration may control the characteristics of the aging mechanism.

Preferred learning methods include:

Learning the source of ARP packets, either ARP requests or ARP replies or both

Learning the destination of ARP replies

Reading, from IP packets, information regarding the source of these IP packets and using this information not to learn new stations but rather only to refresh information, learned by another method, regarding stations already known to the switch.

Learning from the source fields of at least some IP packets.

Learning from the destination fields of at least some IP packets.

Optionally, the switch may allow the user to control the learning mechanism by configuring which IP stations are eligible to be learned for layer-3-switching and which are not eligible to be learned. Only stations that are eligible to be learned are added to the IP table such that packets to them are then routed. Stations that are not eligible to be learned never get into the table so packets to them are never routed by this switch. In other words, packets to the stations that are not eligible to be learned are never forwarded at layer 3 by this switch but rather are always switched at layer 2. In this way, the user ensures that packets for those stations reach a router or another switch that may have extended capabilities in areas such as access control and traffic monitoring. One possible configuration to support this feature includes a "learning control table" storing a list of eligible IP address ranges. An eligible IP address range, e.g. an IP subnet, is a range of IP addresses which are all eligible to be learned. Alternatively, an ineligible IP address range may be stored comprising a range of IP addresses which are all ineligible to be learned.

Figure 7A:
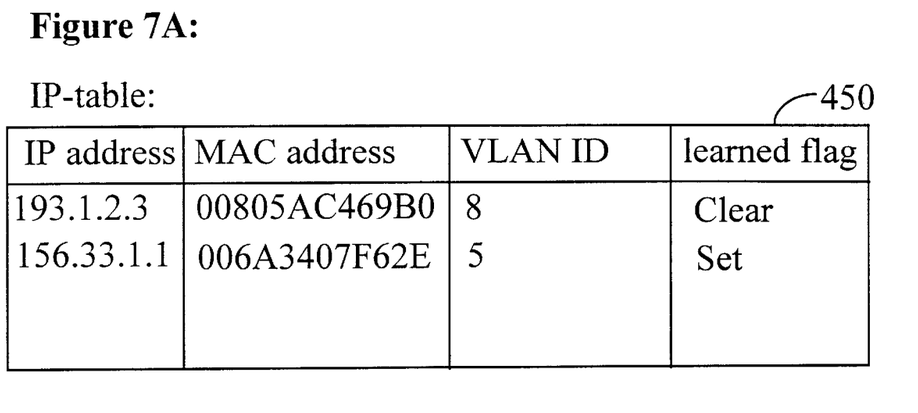
FIG. 7A is an example of an IP table of network element A of FIG. 6.
Figure 7B:
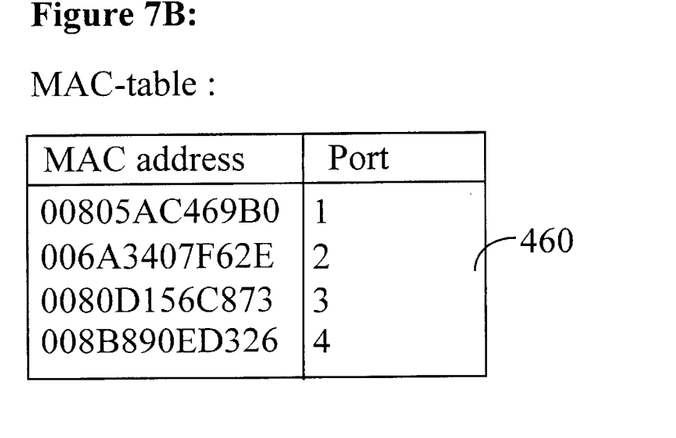
FIG. 7B is an example of a MAC table of network element A of FIG. 6.
Figure 7C:
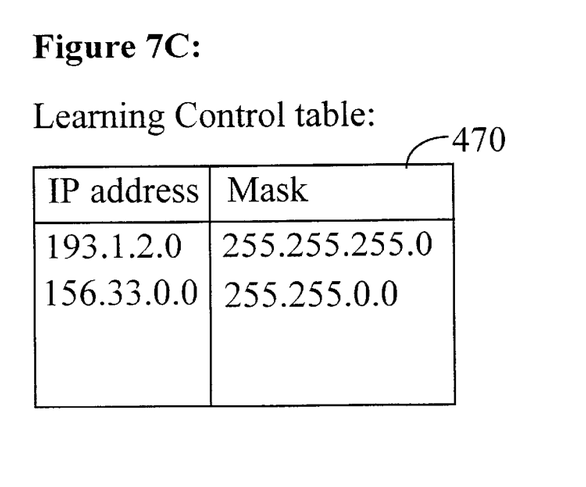
FIG. 7C is an example of a learning control table for network element A of FIG. 6.

For example, the learning control table 470 of FIG. 7C includes a list of IP address ranges e.g. IP subnets. Each IP address range may be defined by an IP address and a mask. The learning control table, in the illustrated embodiment, is utilized to store all eligible IP address ranges. Alternatively, the learning control table may be utilized to store all ineligible IP address ranges. Alternatively, the learning control table may include an additional field storing a flag indicating whether or not the address range corresponding to the flag is eligible or ineligible to be learned.

The switch examines each received packet and identifies whether it requires layer 3 forwarding. This does not have to be based on whether the packet has a destination MAC address of a router, and the switch is not required to know that the router's MAC address is in fact the MAC address of a router. A packet typically requires layer 3 forwarding if all of the following 2 conditions are met:

(a) the destination MAC address of the received packet is known to the switch (i.e. is found in the MAC table 80 of FIG. 2C); and the port number in the MAC table (FIG. 2C) corresponding to the destination MAC address of the received packet is not the port from which the packet was received.

(b) the destination IP address of the received packet is known to the switch (i.e. is found in the IP table 70 of FIG. 2B); and the destination MAC address of the received packet is different than the MAC address corresponding to the destination IP address of the packet, as found in the IP table of FIG. 2B.

Condition (a) is important in order to avoid packet duplication in the case in which the destination MAC address of the packet is reachable via the port from which the packet was received. In this case the station or router, to which the packet was destined at the MAC layer, receives the packet and handles it itself.

The method of the present invention can also work without checking condition (a) if restrictions are applied to the network structure ensuring no such case can occur. An example of such a restriction can be that no 'shared LAN' segments are connected to the switch, and instead, the switch connects only stations or routers.

Condition (b) is important in order to avoid routing (i.e. forwarding in layer 3) of intra-subnet packets, i.e. packets sent between stations in the same IP subnet. Such packets are not destined at any router and are meant to be forwarded at layer 2 (i.e. switched). If the switch forwarded, at layer 3, packets that do not meet condition (b), it would not make any change to the destination MAC address anyway. Though not the preferred embodiment, the method of the present invention can also work without checking condition (b).

Each packet identified as requiring layer 3 forwarding, typically as defined above, is forwarded at layer 3 (i.e. routed) by the switch. Exception packets, like those having IP options or TTL that equals zero, may not be routed by the switch and instead may be forwarded at layer 2 such that they reach the router to which they are destined at the MAC layer and are handled by it.

When the switch forwards at layer 3, it does so preferably according to the standard routing function, including checking packet validity, replacing the MAC header, decrementing TTL and updating the checksum. The switch writes its own MAC address in the source MAC address field of the packet. The switch may have multiple MAC addresses on different VLANs, in which case the MAC address used as source is the one appropriate to the VLAN on which the packet is sent, i.e. the VLAN of the destination, station. Alternative designs can use the same learning and packet identification methods and avoid some parts of the standard. routing function, like forwarding the packet without changing anything except the destination MAC address.

The layer 3 forwarding process in the switch may be combined with some access control packet filtering mechanisms, that may result in blocking the packets and/or in forwarding them at layer 2.

Each packet not identified as requiring layer 3 forwarding (as defined above) is switched at layer 2. This includes packets that do require routing but their destination address is not known to the switch. Such packets will be routed by the router to which they are destined at the MAC layer (or will be routed by another switch which is on the forwarding path to that router). The destination of such packets can be a remote IP address, that is only reachable via a router, and may never be learned by the switch, but it can also be an IP address of a station within the local network, that could be reached from the switch without going through a router. Such local IP addresses will be learned automatically by the switch, hence in general the amount of local traffic going through routers in the network is small, since the appropriate switches will soon learn the new stations and will start handling such traffic themselves.

Figure 6:
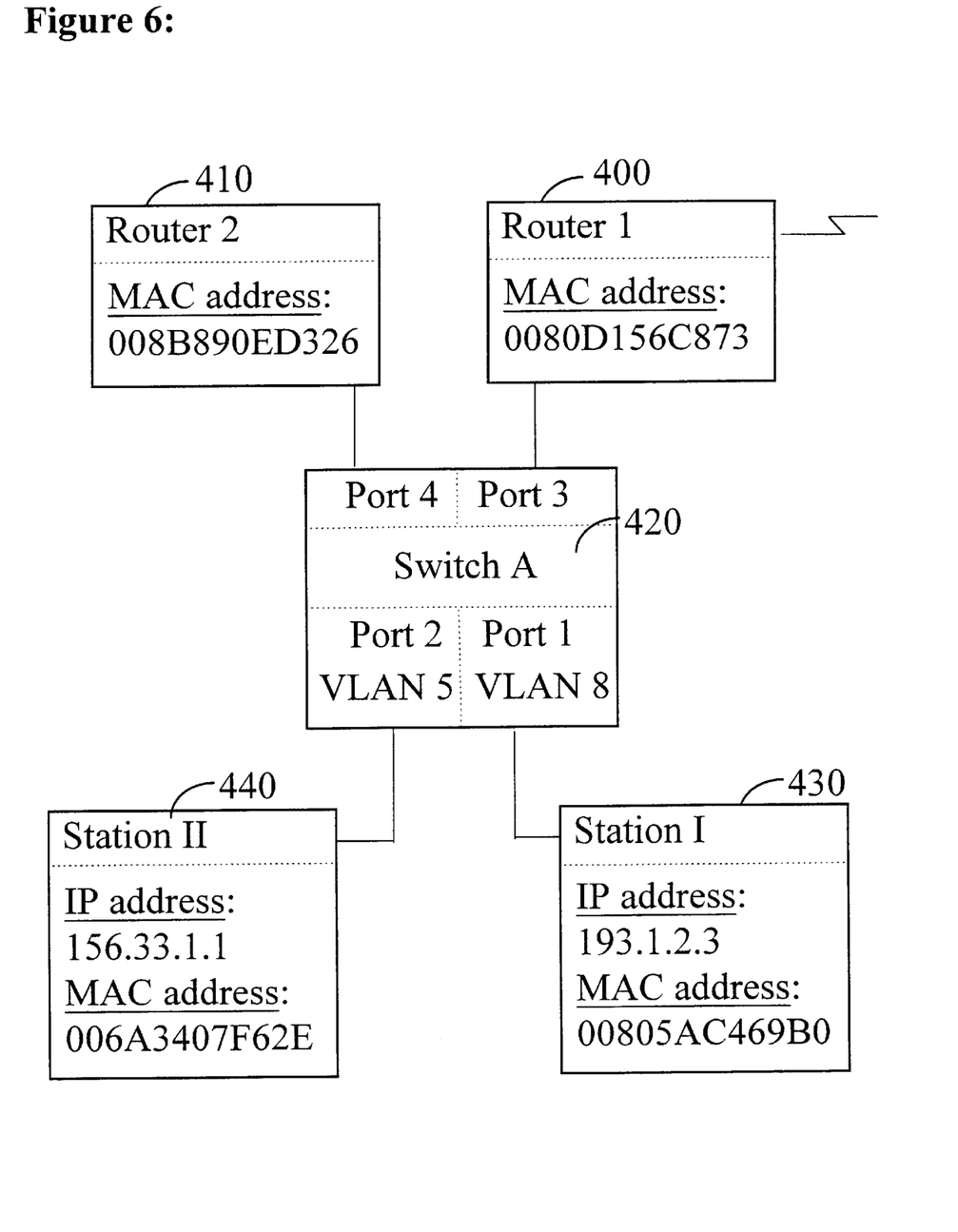
FIG. 6 is a diagram of an example of a network constructed and operative in accordance with another preferred embodiment of the present invention.

Specifically referring to FIGS. 6–9:

FIG. 6 is a diagram of an example of a network constructed and operative in accordance with another preferred embodiment of the present invention. As shown, ports 1 and 2 of switch A are mapped to two respective VLANs whose ID numbers are 5 and 8.

FIG. 7A is an example of an IP table 450 of network element A of FIG. 6. Each record in the IP table contains an IP address, and a MAC-address and VLAN-ID to which packets having this IP-address should be forwarded. Each record also includes a learned-flag indicating how up to date is the information in the other fields of the record. More generally, a router may also have an IP address (not shown) in which case a record, dedicated to that router, is typically added to the IP table 450 of FIG. 7A.

FIG. 7B is an example of a MAC table 460 of network element A of FIG. 6.

FIG. 7C is an example of a Learning Control table 470 of network element A of FIG. 6. As described above, the learning control table 470 of FIG. 7C includes a list of IP address ranges e.g. IP subnets. Each IP address range may be defined by an IP address and a mask. The learning control table may store all eligible IP address ranges or all ineligible IP address ranges or may include an additional field (not shown) storing a flag indicating whether or not the address range corresponding to the flag is eligible or ineligible to be learned.

Figure 8:
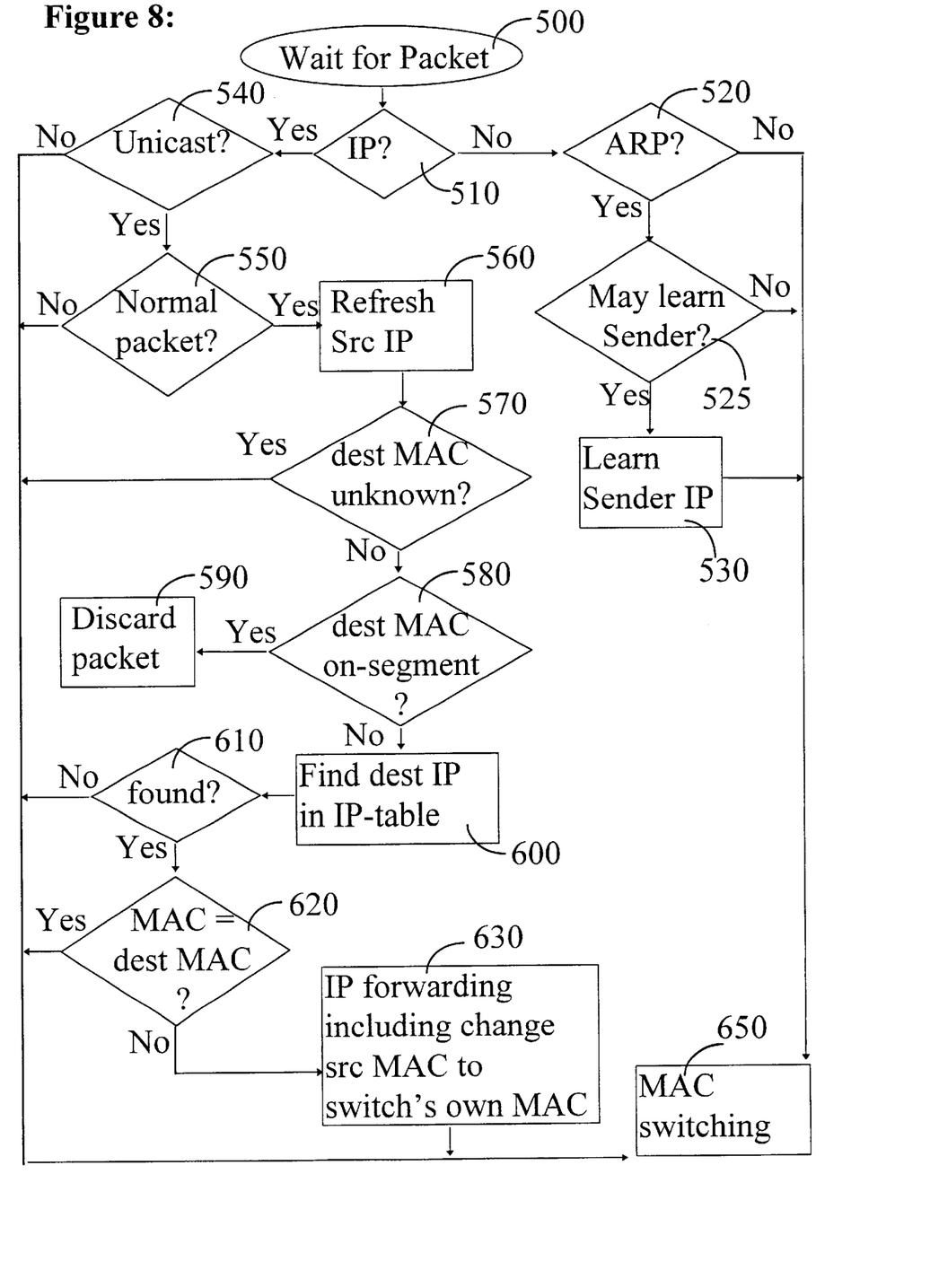
FIG. 8 is a simplified flowchart illustration of packet flow in a network element such as network element A of FIG. 6.
Figure 9:
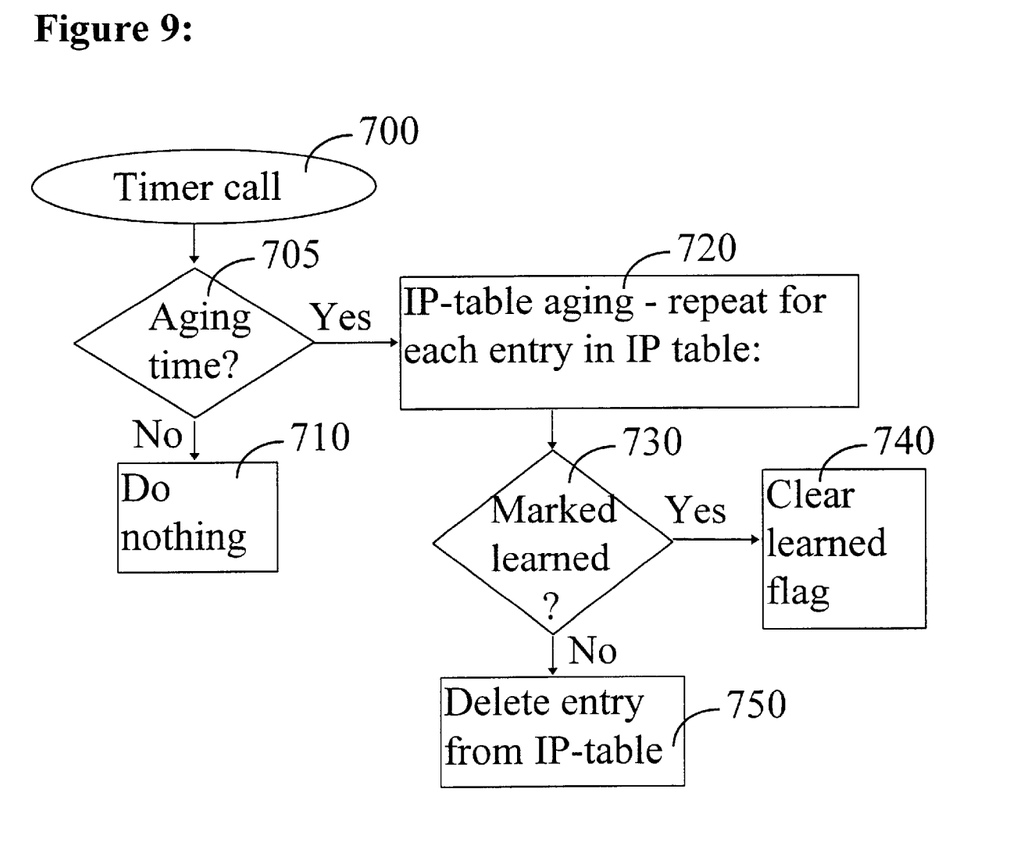
FIG. 9 is a simplified flowchart illustration of a preferred flow control sequence in a network element such as network element A of FIG. 6.

FIGS. 8 and 9 relate to a layer 3 switching method for layer 3 forwarding an individual packet from a station I, connected to a network such as the network of FIG. 6, via a network element A, to a station II which is reachable from network element A. In the method of FIGS. 8 and 9, the packet's layer 2 destination includes the layer 2 address of either a station or of any router within the network. The network element A does not necessarily know which layer 2 addresses belong to routers and which do not. The method including providing network element A with a capability to perform a routing function on a packet, the routing function comprising routing the packet from station I to station II and performing a routing function on said individual packet, at network element A.

FIG. 8 is a simplified flowchart illustration of packet flow in a network element such as network element A of FIG. 6.

IP? (step 510)—The frame is identified as being of type IP. For example, on Ethernet networks, a frame with Ethertype 0x800 carries an IP packet.

ARP? (step 520)—The frame is identified as being of type ARP. For example, on Ethernet networks, a frame with Ethertype 0x860 carries an ARP packet.

MAY LEARN SENDER? (step 525)—The IP address of the sender station (as held in the ARP packet) is checked against the learning control table 470 of FIG. 7C to determine whether or not it is allowed to learn this address.

In step 530 (Learn Sender IP), the method reads sender IP address from the ARP message in the packet. The method finds, in IP-table 450 (FIG. 7A) the record corresponding to this IP address. If there is no such record in the table then the method creates one. The method reads the source MAC address from the sender hardware address field of the ARP message in the packet. This MAC address is written into the MAC address field of that IP-table record. The record is marked as learned by setting the "learned flag" of the record in IP table 450 of FIG. 7A. Optionally, if VLANs are supported, the ID of the VLAN from which the ARP message was received is written into the VLAN ID field of that IP-table record.

UNICAST? (step 540)—The packet is a unicast packet if its destination MAC-address is a unicast MAC address.

NORMAL IP PACKET (step 550)—The IP packet is valid according to the definition in RFC 1812. In addition, the IP packet is of version 4, does not contain any IP options and TTL is greater than 1.

Optionally, in step 560 (Refresh Src IP), the source IP address is read from the IP header of the packet. The method finds in IP-table 450 (FIG. 7A) the record corresponding to this IP address. If there is no such record in the table then the method does nothing and does not create one. If such a record exists, then the source MAC address is read from the MAC header of the packet. If this MAC address is different than the MAC address field of that IP-table record then the method does nothing and does not update the record. If this MAC address is equal to the MAC address field of that IP-table record then the method refreshes the record by setting the record's "learned flag", in the table 450 of FIG. 7A, thereby to mark the record as "learned".

In step 570 (dest MAC unknown), the destination MAC address of the packet is either found or not found in the MAC-table 460 of FIG. 7B.

In step 580 (dest MAC on-segment), the port corresponding to the destination MAC address of the packet in the MAC table 460 of FIG. 7B is or is not equal to the port from which the packet was received.

In step 590 (discard packet), the packet is not forwarded.

In step 600, the IP-table 450 of FIG. 7A is searched in order to find a record that matches the destination IP address of the packet.

In step 610, if a record matching the destination IP address of the packet was found in IP-table 450 by step 600 then do step 620. Otherwise, do step 650.

In step 620 (MAC=dest MAC), the destination MAC address of the packet is or is not equal to the MAC address corresponding to the destination IP address of the packet, as found in the IP-table 450 of FIG. 7A.

IP FORWARDING (step 630)—typically, the standard IP forwarding function as defined in RFC 1812, including:

(a) decrementing TTL by one and updating the IP checksum accordingly;

(b) Replacing the destination MAC address with the MAC address found in the record in IP-table 450 of FIG. 7A corresponding to dest-IP; and (c) replacing the source MAC address with the MAC address of the present switch itself. If the switch has multiple MAC addresses, the method uses the one appropriate to the VLAN on which the packet is to be sent.

MAC SWITCHING (step 650)—the standard MAC switching function as defined in IEEE standard 802.1D, including learning and updating the MAC-table 460 of FIG. 7B.

FIG. 9 is a simplified flowchart illustration of a preferred flow control sequence in a network element such as network element A of FIG. 6.

At timer call (step 700) indicating that a predetermined period of time such as 30 sec has elapsed, the sequence proceeds to step 705.

Decision 705 (Aging time?) is typically positive if e.g. 5 hours have passed since the last time the aging process was performed on the IP table 450 of FIG. 7A, and negative otherwise. If sufficient time has passed, do step 720, otherwise do nothing (step 710).

Step 720 (IP-table aging)—repeat steps 730–750 for each record (i.e. entry) in IP table 450 of FIG. 7A.

Decision 730 (Marked learned?)—is typically positive iff the IP table record presently checked was marked as learned by step 530 or step 560. This is identified by the "learned flag" of the record being set. "Learned flag" is one of the fields of the IP table 450 of FIG. 7A.

Step 740: The "learned flag" field in the IP table 450 of FIG. 7A is cleared.

Step 750 (Delete entry from IP-table)—Delete the currently examined record from the IP table 450 of FIG. 7A.

It is appreciated that hardware components of the present invention may be implemented in software and vice versa. Software components of the present invention may, if desired, be implemented in ROM (read-only memory) form.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A method by which a network element, having a plurality of ports, performs layer 3 forwarding within a network comprising one or more routers, the method comprising:

for each of the one or more routers in the network, identifying at least one of the plurality of ports, via which the router is reachable, as an upstream port with respect to the router, and identifying one or more other ports in the plurality of ports from which the router is not reachable as downstream ports with respect to the router;

learning forwarding information including one or more IP addresses respectively associated with one or more IP stations reachable from the one or more other ports;

receiving a data packet; and performing layer 3 forwarding upon receiving the packet if the packet has a layer 2 destination address equal to a MAC address for one of the one or more routers and has a layer 3 IP destination address equal to one of the one or more learned IP addresses.

2. A method according to claim 1 wherein the packet has a layer 3 IP source address and a layer 3 IP destination address which are in different subnets.

3. A method according to claim 1 wherein the forwarding information comprises the VLAN ID corresponding to the layer 3 IP destination address of the packet.

4. A method according to claim 1 wherein the forwarding information comprises the layer 2 MAC address corresponding to the layer 3 IP destination address of the packet.

5. A method according to claim 1 wherein the forwarding information is learned at least partly by analyzing IP packets passing though the network element.

6. A method according to claim 5 wherein the forwarding information is learned at least partly by analyzing ARP-packets passing through the network element.

7. A method according to claim 6 wherein the forwarding information is learned at least partly by analyzing layer 3 IP packets passing through the network element whose source layer 2 MAC address is an address of a router.

8. A method according to claim 1 wherein the forwarding information is learned entirely by analyzing IP packets passing though the network element.

9. A method according to claim 1 wherein said forwarding information comprises information pertaining only to stations whose IP addresses have been designated by the user as being eligible to be learned.

10. A method according to claim 1 wherein a packet on which layer 3 forwarding is not performed by the network element is forwarded by the network element at layer 2.

11. A layer 3 forwarding method for layer 3 forwarding an individual packet from a station I to a station II wherein the packet's layer 2 destination comprises a router within the network which is reachable from a network element A via which stations I and II are connected to the network, the router storing ARP information, the method comprising:

providing network element A with a capability to perform layer 3 forwarding of a packet from station I to station II, wherein said providing step comprises learning, on the part of network element A, of forwarding information used by the router to forward packets from station I to station II, by reading said ARP information of the router; and performing layer 3 forwarding on said individual packet, at network element A.

12. A method according to claim 11 wherein said step of reading said ARP information comprises using an SNMP mechanism to read said ARP information.

13. A method by which a network element, having a plurality of ports, performs layer 3 forwarding, using forwarding information, within a network comprising at least one router, the method comprising:

learning forwarding information pertaining to stations whose IP addresses have been designated by the user as being eligible to be learned;

upon receiving a packet, determining whether or not the packet requires layer 3 forwarding, without using any information regarding the identity of the router; and performing layer 3 forwarding if the packet requires layer 3 forwarding and if all necessary forwarding information is available, and performing layer 2 forwarding otherwise.

14. A method according to claim 13 wherein the layer 3 source of the packet and the layer 3 destination of the packet are in different subnets.

15. A method according to claim 13 wherein the forwarding information comprises the VLAN ID corresponding to the layer 3 destination of the packet.

16. A method according to claim 13 wherein the forwarding information comprises the layer 2 address corresponding to the layer 3 destination of the packet.

17. A method according to claim 16 wherein layer 3 forwarding is performed on said packet by the network element, only if said layer 2 address corresponding to the packet's layer 3 destination, as known to the network element, is different than the destination layer 2 address of said packet.

18. A method according to claim 17 wherein a packet on which layer 3 forwarding is not performed by the network element is forwarded by the network element at layer 2.

19. A method according to claim 13 wherein the forwarding information is learned at least partly by analyzing packets passing though the network element.

20. A method according to claim 19 wherein the forwarding information is learned at least partly by analyzing ARP-packets passing through the network element.

21. A method according to claim 19 wherein the forwarding information is learned at least partly by analyzing IP-packets passing through the network element.

22. A method according to claim 19 wherein the forwarding information is learned at least partly by analyzing layer 3 packets passing through the network element whose source layer 2 address is an address of a router.

23. A method according to claim 13 wherein the forwarding information is learned entirely by analyzing packets passing though the network element.

24. A method according to claim 13 wherein layer 3 forwarding of said packet is performed by the network element only if the destination layer 2 address of said packet is known to the network element to be reachable via a port that is different than the port from which said packet was received at the network element.

25. A method according to claim 24 wherein the packet is discarded if the destination layer 2 address of said packet is known to the network element to be reachable via the port from which said packet was received at the network element.

26. A method according to claim 13 wherein said performing step includes changing the source layer 2 address of said packet to a layer 2 address of network element A.

27. A system by which a network element, having a plurality of ports, performs layer 3 forwarding within a network comprising one or more routers, the system comprising:

a port identifier operative, for each router in the network, to identify at least one of the plurality of ports, via which the router is reachable, as an upstream port with respect to the router, and to identify one or more other ports in the plurality of ports from which the router is not reachable as downstream ports with respect to the router;

a learning unit operative to learn forwarding information including one or more IP addresses respectively associated with one or more IP stations reachable from the one or more other ports; and a layer 3 forwarding unit operative, upon receiving a packet having a layer 2 destination address equal to a MAC address for one of the one or more routers and having a layer 3 IP destination address equal to one of the one or more learned IP addresses, to perform layer 3 forwarding.

28. A layer 3 forwarding system for layer 3 forwarding an individual packet from a station I to a station II wherein the packet's layer 2 destination comprises a router within the network which is reachable from a network element A via which stations I and II are connected to the network, the router storing ARP information, the system comprising:

a learning unit operative to provide network element A with a capability to perform layer 3 forwarding of a packet from station I to station II, wherein said providing step comprises learning, on the part of network element A, of forwarding information used by the router to forward packets from station I to station II, by reading said ARP information of the router; and at network element A, a layer 3 forwarding unit for layer 3 forwarding of said individual packet.

29. A system by which a network element, having a plurality of ports, performs layer 3 forwarding, using forwarding information, within a network comprising at least one router, the system comprising:

means for learning forwarding information pertaining to stations whose IP addresses have been designated by the user as being eligible to be learned;

means for determining, upon receiving a packet, whether or not the packet requires layer 3 forwarding, without using any information regarding the identity of the router; and means for performing layer 3 forwarding if the packet requires layer 3 forwarding and if all necessary forwarding information is available, and for performing layer 2 forwarding otherwise.

* * * * *